United States Patent
Adrain

Patent Number: 5,831,669
Date of Patent: *Nov. 3, 1998

[54] FACILITY MONITORING SYSTEM WITH IMAGE MEMORY AND CORRELATION

[76] Inventor: John B. Adrain, Box 299, Salt Lake City, Utah 84110

[*] Notice: This patent issued on a continued prosecution application filed under 37 CFR 1.53(d), and is subject to the twenty year patent term provisions of 35 U.S.C. 154(a)(2).

[21] Appl. No.: 677,100
[22] Filed: Jul. 9, 1996
[51] Int. Cl.6 .................................................. H04N 7/18
[52] U.S. Cl. ................................... 348/143; 348/159
[58] Field of Search ................................. 348/143, 152, 348/155, 156, 159, 161; 382/156, 159; H04N 7/18

[56] References Cited

U.S. PATENT DOCUMENTS

| | | |
|---|---|---|
| 4,185,298 | 1/1980 | Billet et al. . |
| 4,547,897 | 10/1985 | Peterson . |
| 4,704,694 | 11/1987 | Czerniejewski . |
| 4,728,195 | 3/1988 | Silver . |
| 4,972,359 | 11/1990 | Silver et al. . |
| 5,293,428 | 3/1994 | Kondou et al. . |
| 5,367,439 | 11/1994 | Mayer et al. . |
| 5,371,690 | 12/1994 | Engel et al. . |
| 5,426,509 | 6/1995 | Peplinski . |

*Primary Examiner*—Howard Britton
*Attorney, Agent, or Firm*—Pearne, Gordon, McCoy & Granger LLP

[57] ABSTRACT

A video image of a space is monitored and compared to a reference image. Correlation of the images indicates presence of unwanted persons or objects or the occurrence of unwanted events. When programmed comparison criteria are met, an alarm is activated, the space is displayed on a monitor, and the image is stored in memory. Reference images are stored during dedicated or ongoing learn modes.

20 Claims, 2 Drawing Sheets

FACILITY MONITORING SYSTEM WITH IMAGE MEMORY AND CORRELATION

BACKGROUND OF THE INVENTION

1. Field of the Invention

This invention relates generally to the field of monitoring and security and specifically to a system that records images and identifies correlation or lack of correlation with the images.

2. Description of the Related Art

Video cameras are used for monitoring activity in myriad locations and applications. Commonly, a person views a display showing a scene viewed by the cameras. A single display might receive input from several cameras or each camera might have a dedicated display. Frequently, the person is responsible for monitoring several displays, in addition to other responsibilities. The person cannot give undivided attention to each monitor. Even if the person is responsible only for monitoring a single display, fatigue, boredom, hypnosis, or other factors can cause the person to miss events shown on the display.

Events recorded by the cameras are frequently stored on tape or by some other memory device for subsequent review. This permits replay and careful review, but monitoring is not automatic and not coincident with the events being recorded.

Machine vision devices employing digital image processing are used in manufacturing to test proper positioning, assembly and construction of parts and components. Numerous images of parts or assemblies are successively compared to reference images. Correlation and other characteristics of the comparisons are determined. If a part or assembly does not meet selected criteria, it is determined to be defective and is removed from the manufacturing operation. Examples of such devices and associated systems are shown in U.S. Pat. Nos. 4,185,298; 4,704,694; 4,728,195; 4,972,359; 5,293,428; 5,367,439; 5,371,690; 5,426,509.

SUMMARY OF THE INVENTION

The present invention provides a monitoring system having a camera adapted for receiving images of a space to be monitored. An interpreter receives image data from the camera, and a reference memory stores reference image data. A comparator is connected for comparing image data from the interpreter to image data from the reference memory according to selected comparison criteria. An output interface reports results of the image data comparisons performed by the comparator.

A programmer is provided for inputting the comparison criteria to the comparator. The programmer is connected for inputting analysis criteria to the interpreter and the interpreter is adapted for analyzing the image data according to the analysis criteria. The programmer is connected for inputting learn criteria to the interpreter and the interpreter is connected for storing image data from the camera in the reference memory according to the learn and analysis criteria. The programmer is connected for inputting learn criteria to the interpreter and the interpreter is connected for storing image data from the camera in the reference memory according to the learn criteria. The programmer is connected for inputting utilization criteria, the output interface being adapted for reporting selected comparison results according the utilization criteria.

A record memory is connected for storing image data from the output interface. The record memory is adapted for storing information associated with the image data stored. A video monitor is provided for displaying images from the output interface. A second camera is connected to provide image data to the interpreter, wherein the interpreter derives a three-dimensional image of the space and the reference memory, comparator, and output interface are adapted for processing three-dimensional image data.

The interpreter is adapted for storing in the reference memory image data from the camera. The interpreter is adapted for periodically storing in the reference memory image data from the camera according to learn criteria. The reference memory is adapted for storing image data for plural images and the comparator is adapted for comparing image data from the interpreter to image data for the plural images from the reference memory according to selected comparison criteria. The camera is mounted to a movable support, such as a vehicle, and the space to be monitored changes according to movement of the support. Alternatively, the camera is mounted to a stationary support. The interpreter is adapted for dividing image data into zones and the comparator is adapted for comparing image data corresponding to the different zones with image data from the reference memory according to different comparison criteria for each zone. The interpreter is adapted for disregarding image data corresponding with a certain zone selected according to selected analysis criteria. The comparator is adapted for sequentially comparing the image data from the different zones and discontinuing comparison of an image upon failure to meet the comparison criteria for the zone being compared. The interpreter is adapted for dividing image data into zones and different criteria are applied to different zones of the image data.

The invention also provides a method of monitoring a space. Method steps include receiving a first set of image data from the space; identifying and selecting a portion of the information to be stored according to analysis and learn criteria; storing the selected information; receiving a second set of image data from the space; identifying and selecting a portion of the second set of image data to be analyzed according to the analysis criteria; comparing the selected portions of the sets of image data to each other so as to determine a correlation of the images; and indicating whether the correlation of the images meets selected comparison criteria.

Additional steps include reporting results of the comparison step according to utilization criteria; establishing the analysis and learn criteria; establishing the comparison criteria; and establishing the utilization criteria. The step of indicating includes recording image data according to utilization criteria. Plural sets of image data are stored and the step of comparing the image data comprises comparison of the plural sets of image data to one of the sets of image data. The image data are sequentially received from different spaces. The step of storing data includes establishing baseline image data and subsequently storing changes from the baseline data. The portions of data selected represent a zone of the space. The steps are repeated for selected data representing a different zone of the space and at least one set of the analysis, learn, and comparison criteria is different from the previous criteria.

The system according to the invention has application in numerous situations where video or human monitoring is presently utilized. In addition, this system has application where video and other forms of monitoring have been ineffective. For example, casinos can use this system for identifying irregularities in the dealing and playing of cards and other games. Commercial facilities can use the system for reliably identifying breaches of security with minimal false alarms. Law enforcement officials can use the system to monitor license plates with mobile or stationary equipment for identifying stolen vehicles.

DESCRIPTION OF THE PREFERRED EMBODIMENTS

Figure 1:
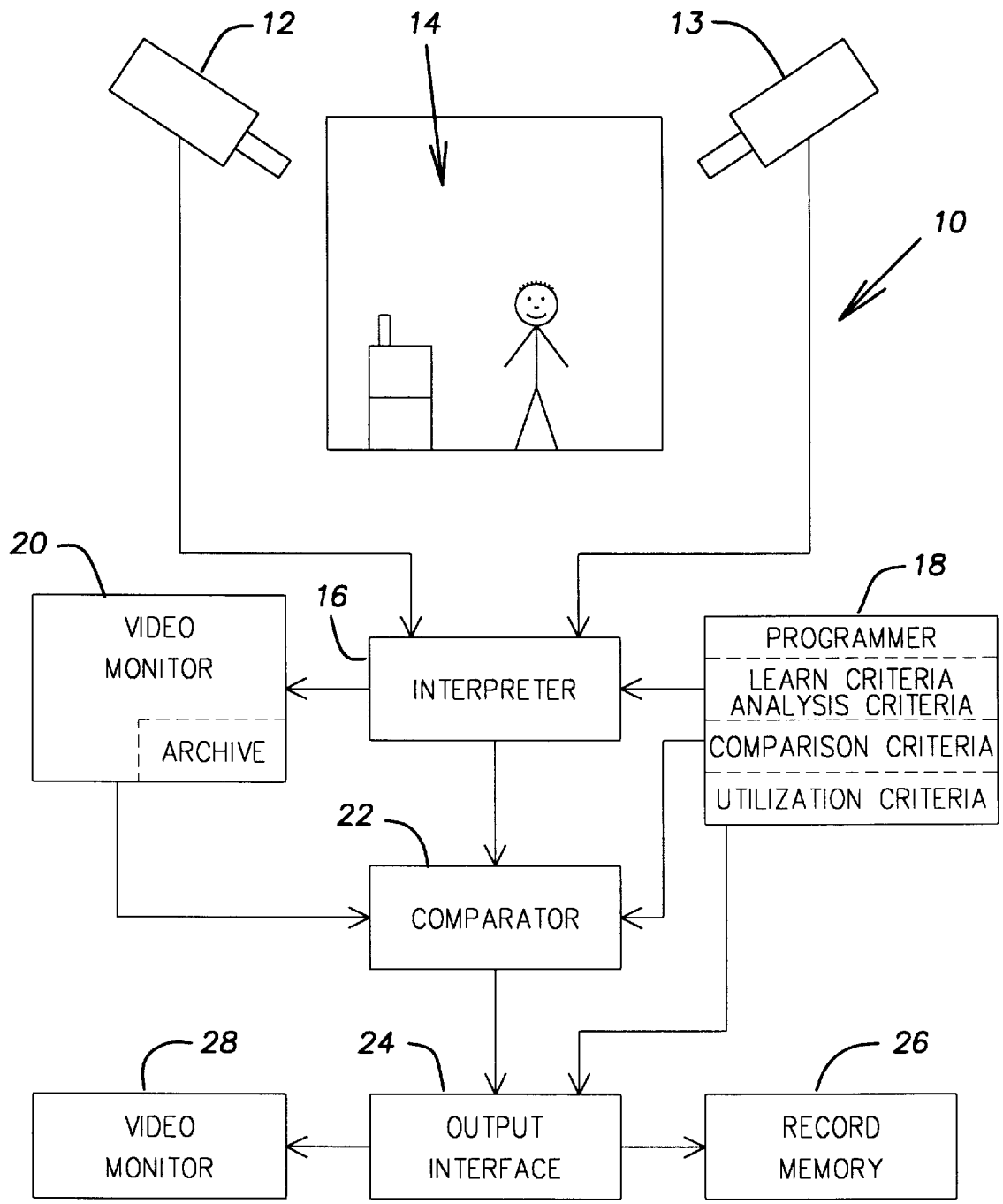
FIG. 1 shows a block diagram of a monitoring system according to the invention.

Referring to FIG. 1, a monitoring system 10 includes cameras 12, 13 for monitoring a space 14. The space 14 can be a room, an entry, a passage, or any other location. The cameras 12, 13 are mounted on stationary supports, such as walls of the space 14. In one embodiment, the camera 12 is a digital video camera translating visible images into digital electric signals. As discussed below, other cameras are also suitable, such as analog or infrared. A single camera can be used for two dimensional images; Two cameras are used for three-dimensional images, wherein an interpreter derives the three-dimensional image from image data received from the two cameras. Additional cameras can be used for monitoring different spaces or different characteristics of the same space. The cameras are connected to input image data to an interpreter 16. The interpreter 16 selects image data from the cameras 12, 13 according to analysis criteria input from a programmer 18. Programming can be performed directly by user inputs provided at the programmer or remotely, for example by a modem using a computer with a program interface. A reference memory 20 receives data from the interpreter 16 according to storage criteria input to the interpreter by the programmer 18. A comparator 22 receives data from the interpreter 16 and reference memory 20 and compares these data according to comparison criteria input by the programmer 18. The comparator 22 determines a correlation between pixels from the reference memory 20 and pixels from the interpreter 16. If the comparator 22 determines that the correlation falls within or outside of a selected range requiring action, results of the comparison are input to an output interface 24, such as an alarm panel, a memory interface, or a video monitor interface. The output interface 24 reports results of the comparison by selecting comparison data to be stored or otherwise utilized by a record memory 26 or monitor 28, for example, connected to receive data from the output interface according to criteria input by the programmer 18. Preferably, the interpreter 16, programmer 18, reference memory 20, comparator 22, and output interface 24 are integrated in a microcomputer and associated software.

Using the programmer 18, a user inputs learn criteria, including analysis and storage criteria for reference images to be stored in the reference memory. For example, the user can instruct the interpreter 16 to identify and store in the reference memory 20 a pixel representation of all stationary objects on a shelf in the space 14 at a selected time. The interpreter 16 identifies the object images meeting the programmed criteria, and stores the images in the reference memory 20. The reference memory can be divided into sections for storing different types of data. The reference memory can include an archive section in which baseline image data are stored. After storing the baseline data, subsequent images can be stored by storing only data that have changed from the baseline. According to user programming, the storing of images can be repeated at selected times or continuously according to the learn criteria. For example, the stationary objects can be identified at the same time every day, or when a person whose image data is in the reference memory appears in the space with a new person, the new person's image data is stored in the reference memory. Also, the learn criteria can be automatically revised to create new learn criteria according to image data from the interpreter and the current learn criteria.

The user also programs analysis criteria for monitoring the space. For example, the interpreter 16 can monitor image data from the camera 12 during certain time periods when the images of the stationary objects are not supposed to be moved.

The user also inputs comparison criteria. Comparison criteria include selecting the images to be compared and a range of correlation in which the monitored image is sufficiently like the reference image for a particular purpose. For example, stationary object images and monitored images are compared to determine whether any object previously identified as stationary is not in its previous location. Image data from the interpreter and the reference memory are compared by the comparator 22 according to the comparison criteria to determine correlation of the images. For example, if the location of an object in the image data from the interpreter is not the same as the location of the same object in the reference memory, then the comparator sends an alarm signal to the output interface 24 indicating an alarm condition. Sensitivity of the correlation can be adjusted. For example, the alarm condition can occur on any movement of an object or only on complete absence of an object from the space. The comparison criteria can include events or movements as well as stationary patterns. For example, a person's hand would be an acceptable stationary pattern, but a pixel pattern representing sudden movement of the hand, such as striking something, would represent an impermissible event causing an alarm. The alarm signal can include an image of the space, an identification of the space or the object, the time of the signal, or any other signal indicating that the comparison criteria have been met or not met, as is appropriate. The output interface 24 selects and/or translates the appropriate signals and forwards them to output devices. For example, an audible alarm sounds and the monitor 28 shows the video image of the space 14 when the object is moved, and the image, date and time of the movement of the object is recorded in the record memory 26. Multiple monitoring system components can be connected to a single output interface and monitor to monitor different spaces or different parts of a space. When an alarm condition arises in one space, its output is sent to the monitor and can be augmented by other information such as sound from the space being monitored and information about the space or condition.

Learning and analysis can be performed separately or coincidentally. Learning can be accomplished directly by entering a learn only mode and recording images in the reference memory. Learning can also be accomplished indirectly, for example by association of new images with previously learned images or by receiving new images during permitted learning periods that coincide with monitoring periods.

Figure 2:
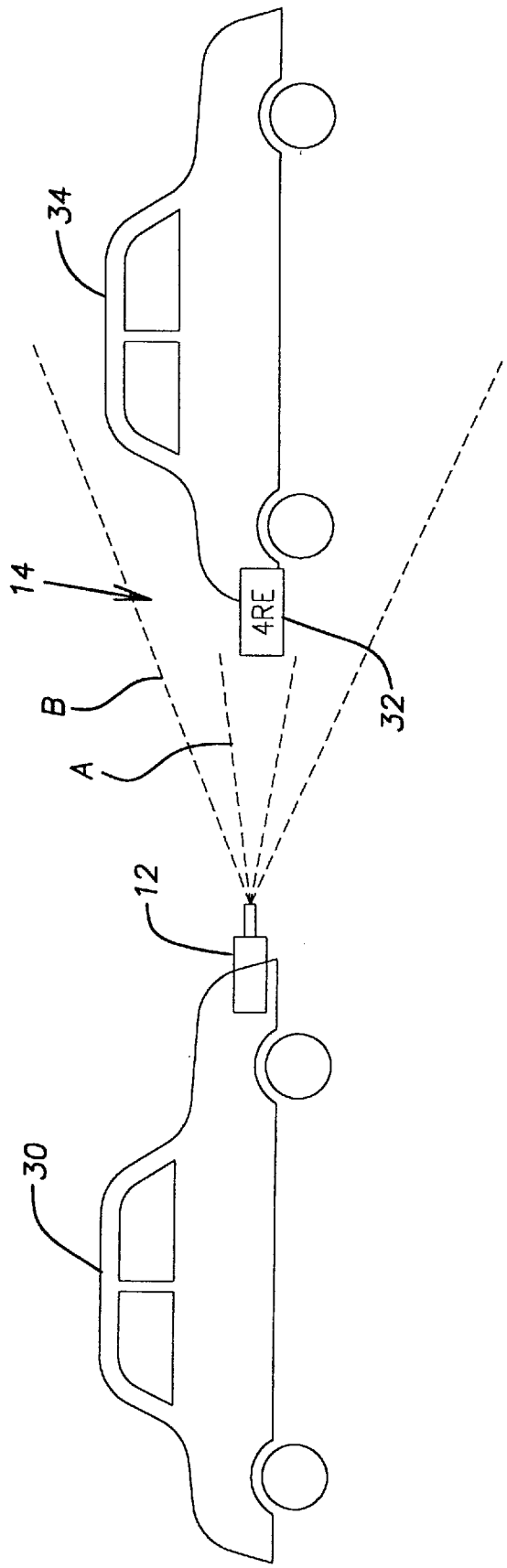
FIG. 2 shows a schematic diagram of another embodiment of the invention.

Referring to FIG. 2, the camera 12 can be mounted on a mobile support, such as a vehicle 30. The space 14 and objects 32 being monitored change according to movement of the vehicle 30. For example, the camera can be mounted on a police car and programmed to monitor license plate numbers. The reference memory stores license numbers for stolen cars. Analysis is limited to consistently sized characters within a specified boundary, that is the rectangular shape of the license plate. When the object 32 meets the analysis criteria of a license plate, the number is compared to the numbers in the reference memory. When the comparison finds a match, an appropriate alarm indicates discovery of a stolen car to officers in the police car. Information about the car and possible occupants can be displayed as well.

The invention, as shown for example in FIGS. 1 and 2, can be used in numerous methods of operation. The license plate example utilizes a high degree of correlation between the reference image and the monitored image. Other aspects of the invention, discussed previously and below, utilize lack of correlation between the reference and monitored images to trigger an alarm condition. Combinations of these aspects can also be used for different objects or spaces monitored by the same system.

A limited access entry or passage, an office or workspace, or a home can be monitored. The learn criteria identify persons permitted to be in the monitored space, image data of their faces being stored in the reference memory. The space monitored is generally consistent so that the analysis criteria ignore the environment and limit the analysis to the faces of persons in the space. The comparison criteria are set to identify unauthorized persons in the space according to comparison of persons in the space with persons in the reference memory. The comparison allows for variations in appearance, such as changes in hair style or facial expressions, by allowing pixel comparisons to vary within a range and by focusing on less changeable parts, such as the nose.

Sensitivity of the correlation can be varied within a space being monitored. Image data for a space can be divided into zones in which different learn, analysis, comparison, and/or utilization criteria apply. For example, monitoring roads to locate license plates, as described with reference to FIG. 2, can also include monitoring the object vehicles 34. License plate characters are uniform, so close correlation of the reference and object in zone A is desired. The color and general outline of the object vehicle can also be analyzed, however, lesser correlation is desired in zone B because different lighting can affect color and the amount of data required for the comparison can be limited. Also, assuming the license plate characters match, close correlation of the vehicle comparison may not be necessary. An alternative analysis and comparison would identify a license plate match in zone A and then compare the vehicle outline in zone B. If the vehicle outline does not sufficiently correlate with the image data corresponding to the license plate number, the output interface would report that the license plate has been switched from the vehicle on which the plate is supposed to be mounted.

Images from different zones can be compared sequentially. The results of a comparison in one zone can affect whether and how a subsequent comparison is performed. For example, the results of a comparison in one zone can determine which zone and/or what comparison criteria are used for a subsequent comparison.

Another method monitors a consistent space, with many different objects and persons. The analysis is limited to specifically defined movements or events possibly within a specified zone. For example, cheating at a casino black jack table is monitored by identifying cards that move outside a selected zone on the table. Also, a person's hand or arm that reaches from the players' side of the table into a forbidden zone will trigger an alarm. However, the dealer's arms and the movement of cards in the playing zone are ignored. Events occurring away from the table are also ignored although they might be recorded for the purpose of identifying the offending player.

In some applications, all but very specific events can be ignored. For example, bank employees can be trained to make a certain movement during a robbery. To the uninitiated, the signal appears innocuous, but the monitoring system is programmed to recognize the movement and trigger an alarm. Like a password, the movement can be changed and accordingly reprogrammed in the system.

Data other than visual images can also be analyzed. For example, thermal images can be used to sense overheating of equipment or fires in facilities. Micropower impulse radar (MIR) can be used to monitor spaces through smoke, walls, or other opaque materials. Different types of cameras or cameras collecting different types of image data can be combined. For example, a thermal camera can monitor a space to sense a fire. A radar camera can monitor the same space to sense whether floors or walls have collapsed due to the fire.

Monitoring can be accomplished in real time or using images collected previously. For example, an amusement park can use cameras located at different points in the park. Analysis of traffic flow can be analyzed in real time based on criteria selected prior to monitoring. Results can be used immediately to correct for unwanted conditions. Alternatively, the cameras can collect image data for storage. At a later time, comparison can be made based on criteria selected at the later time and the comparison results used to establish a statistical database for future planning.

The present disclosure describes several embodiments of the invention, however, the invention is not limited to these embodiments. Other variations are contemplated to be within the spirit and scope of the invention and appended claims.

What is claimed is:

1. A monitoring system comprising:
   a movably mounted camera adapted for receiving images of a space to be monitored;
   an interpreter for receiving image data from the camera;
   a reference memory for storing reference image data;
   a comparator connected for comparing image data from the interpreter to image data from the reference memory according to selected comparison criteria, wherein the interpreter and comparator cooperate to select recognizable portions of image data among unrecognized portions of image data in the space being monitored, the selected image portions being compared to the image data in the reference memory; and
   an output interface for reporting results of the image data comparisons performed by the comparator.

2. A system according to claim 1 further comprising a programmer for inputting the comparison criteria to the comparator.

3. A system according to claim 2 wherein the programmer is connected for inputting analysis criteria to the interpreter and the interpreter is adapted for analyzing the image data according to the analysis criteria.

4. A system according to claim 3 wherein the programmer is connected for inputting learn criteria to the interpreter and the interpreter is connected for storing image data from the camera in the reference memory according to the learn and analysis criteria.

5. A system according to claim 2 wherein the programmer is connected for inputting learn criteria to the interpreter and the interpreter is connected for storing image data from the camera in the reference memory according to the learn criteria.

6. A system according to claim 2 wherein the programmer is connected for inputting utilization criteria, the output interface being adapted for reporting selected comparison results according the utilization criteria.

7. A system according to claim 1 wherein the camera is mounted on a vehicle.

8. A system according to claim 1 wherein the record memory is adapted for storing information associated with the image data stored.

9. A system according to claim 1 wherein the interpreter selects images according to analysis criteria so that only the selected images are input to the comparator for comparison to reference images.

10. A system according to claim 9 wherein the selected images represent only portions of a larger image.

11. A monitoring system comprising:

a movably mounted camera adapted for receiving images of a space to be monitored;

an interpreter for receiving image data from the camera;

a reference memory for storing reference image data for plural images and a comparator adapted for comparing image data from the interpreter to image data for the plural images from the reference memory according to selected comparison criteria, wherein the interpreter and comparator cooperate to select recognizable portions of image data among unrecognized portions of image data in the space being monitored, the selected image portions being compared to the image data in the reference memory; and an output interface for reporting results of the image data comparisons performed by the comparator.

12. A method of monitoring a space comprising the steps of:

receiving a first set of image data from the space representing plural images;

identifying and selecting a portion of the information to be stored according to analysis and learn criteria;

storing the selected information;

receiving a second set of image data from the space;

identifying and selecting a portion of the second set of image data to be analyzed according to the analysis criteria, wherein the selected portion represents a recognizable portion of image data among unrecognized portions of image data in the space being monitored;

comparing the selected portions of the sets of image data to each other so as to compare the second set of image data to the plural images of the first set and determine a correlation of the images; and indicating whether the correlation of the images meets selected comparison criteria.

13. A method according to claim 12 further comprising the step of reporting results of the comparison step according to utilization criteria and augmenting the reporting with identifying information.

14. A method according to claim 12 further comprising the step of establishing the analysis and learn criteria.

15. A method according to claim 12 further comprising the step of establishing the comparison criteria.

16. A method according to claim 12 wherein the image data are sequentially received from different spaces.

17. A method according to claim 12 wherein the step of storing data includes establishing baseline image data and subsequently storing changes from the baseline data.

18. A method according to claim 12 wherein the portions of data selected represent a zone of the space.

19. A method according to claim 18 wherein the steps are repeated for selected data representing a different zone of the space and at least one set of the analysis, learn, and comparison criteria is different from the previous criteria.

20. A method according to claim 12 wherein the comparison of image data is repeated to distinguish between movements based on a series of sequential images.

* * * * *

UNITED STATES PATENT AND TRADEMARK OFFICE
CERTIFICATE OF CORRECTION

PATENT NO. : 5,831,669 C1  
APPLICATION NO. : 90/011233  
DATED : August 21, 2012  
INVENTOR(S) : John B. Adrain Page 1 of 1

It is certified that error appears in the above-identified patent and that said Letters Patent is hereby corrected as shown below:

On the cover page item [73] delete "Assignee: Ericsson Inc., Menlo Park, CA (US)".

Signed and Sealed this  
Second Day of October, 2012

David J. Kappos  
*Director of the United States Patent and Trademark Office*

(12) EX PARTE REEXAMINATION CERTIFICATE (9209th)
United States Patent
Adrain

(10) Number: US 5,831,669 C1
(45) Certificate Issued: Aug. 21, 2012

(54) FACILITY MONITORING SYSTEM WITH IMAGE MEMORY AND CORRELATION

(75) Inventor: John B. Adrain, Salt Lake City, UT (US)

(73) Assignee: Ericsson Inc., Menlo Park, CA (US)

Reexamination Request:
No. 90/011,233, Sep. 14, 2010

Reexamination Certificate for:
Patent No.: 5,831,669
Issued: Nov. 3, 1998
Appl. No.: 08/677,100
Filed: Jul. 9, 1996

(51) Int. Cl.
*H04N 7/18* (2006.01)

(52) U.S. Cl. .................. 348/143; 348/152; 348/155; 348/156; 348/159; 348/161; 382/156; 382/159

(58) Field of Classification Search .................. 348/143
See application file for complete search history.

(56) References Cited

To view the complete listing of prior art documents cited during the proceeding for Reexamination Control Number 90/011,233, please refer to the USPTO's public Patent Application Information Retrieval (PAIR) system under the Display References tab.

*Primary Examiner* — Henry N Tran

(57) ABSTRACT

A video image of a space is monitored and compared to a reference image. Correlation of the images indicates presence of unwanted persons or objects or the occurrence of unwanted events. When programmed comparison criteria are met, an alarm is activated, the space is displayed on a monitor, and the image is stored in memory. Reference images are stored during dedicated or ongoing learn modes.

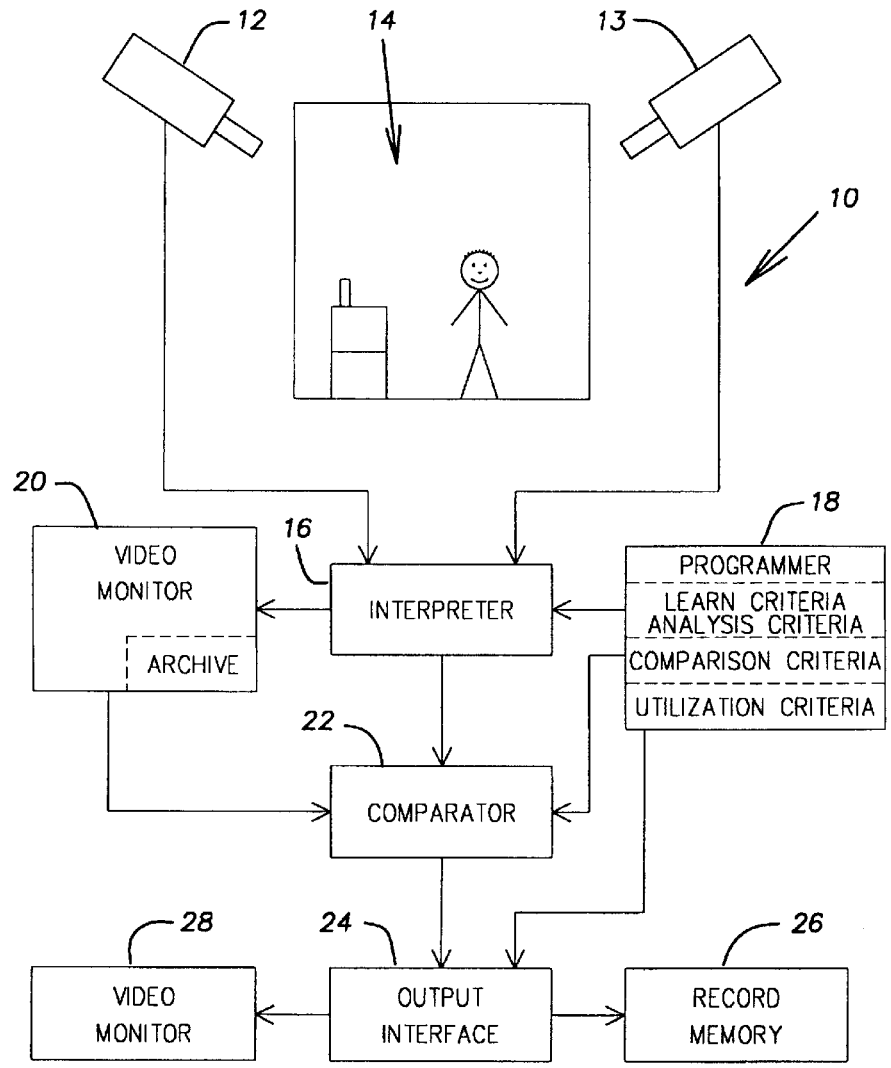

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 11 are cancelled.

Claims 2 and 7-9 are determined to be patentable as amended.

Claims 3 and 10, dependent on an amended claim, are determined to be patentable.

New claims 21-52 are added and determined to be patentable.

Claims 4-6 and 12-20 were not reexamined.

Other new claims 53-56 were canceled by the Examiner's Amendment.

2. A system according to claim [1] *51* further comprising programmer for inputting the comparison criteria to the comparator.

7. A system according to claim [1] *51* wherein the camera is mounted on a vehicle.

8. A system according to claim [1] *51* wherein the record memory is adapted for storing information associated with the image data stored.

9. A system according to claim [1] *51* wherein the interpreter selects images according to analysis criteria so that only the selected images are input to the comparator for comparison to reference images.

*21. The monitoring system of claim 51, wherein said digital camera is adapted to receive images using RADAR, thermal, or infrared detection of for receiving images through an opaque material.*

*22. The monitoring system of claim 51, further comprising an additional camera for receiving images for outputting to said interpreter.*

*23. The monitoring system of claim 22, wherein said additional camera is used with said digital camera such that the received images are three-dimensional images.*

*24. The monitoring system of claim 51, wherein said digital camera is mounted on a vehicle and wherein said images include images of a license plate on an additional vehicle and wherein said images also include images of the additional vehicle, and further wherein said recognizable images include images for identifying alphanumeric characters on said license plate and also include images for identifying a characteristic of said additional vehicle.*

*25. The monitoring system of claim 52, wherein said digital camera is adapted to receive images using RADAR, thermal, or infrared detection or for receiving images through an opaque material.*

*26. The monitoring system of claim 52, further comprising an additional camera for receiving images for outputting to said interpreter.*

*27. The monitoring system of claim 26, wherein said additional camera is used with said digital camera such that the received images are three-dimensional images.*

*28. The monitoring system of claim 52, wherein said digital camera is mounted on a vehicle.*

*29. The monitoring system of claim 51, wherein said digital camera is mounted on a vehicle and wherein said images include images of a license plate on an additional vehicle and wherein said images also include images of the additional vehicle, and further wherein said recognizable images include images for identifying alphanumeric characters on said license plate and also include images for identifying a characteristic of said additional vehicle.*

*30. A monitoring system comprising:*
*a movably mounted camera adapted for receiving images of a space to be monitored by detecting RADAR, thermal, or infrared images or for detecting images through an opaque material;*
*an interpreter for receiving image data from the camera;*
*a reference memory for storing reference image data;*
*a comparator connected for comparing image data from the interpreter to image data from the reference memory according to selected comparison criteria, wherein the interpreter and comparator cooperate to select recognizable portions of image data among unrecognized portions of image data in the space being monitored, the selected image portions being compared to the image data in the reference memory; and an output interface for reporting results of the image data comparisons performed by the comparator.*

*31. A system according to claim 30 further comprising a programmer for inputting the comparision criteria to the comparator.*

*32. A system according to claim 31 wherein the programmer is connected for inputting analysis criteria to the interpreter and the interpreter is adapted for analyzing the image data according to the analysis criteria.*

*33. A system according to claim 32 wherein the programmer is connected for inputting learn criteria to the interpreter and the interpreter is connected for storing image data from the camera in the reference memory according to the learn and analysis criteria.*

*34. A system according to claim 31 wherein the programmer is connected for inputting learn criteria to the interpreter and the interpreter is connected for storing image data from the camera in the reference memory according to the learn criteria.*

*35. A system according to claim 31 wherein the programmer is connected for inputting utilization criteria, the output interface being adapted for reporting selected comparison results according the utilization criteria.*

*36. A system according to claim 30 wherein the camera is mounted on a vehicle.*

*37. A system according to claim 30 wherein the reference memory is adapted for storing information associated with the image data stored.*

38. A system according to claim 30 wherein the interpreter selects images according to analysis criteria so that only the selected images are input to the comparator for comparison to reference images.

39. A system according to claim 38 wherein the selected images represent only portions of a larger image.

40. A system according to claim 30, wherein said camera is a digital camera, and wherein said image data is digital image data.

41. The monitoring system of claim 30, further comprising an additional camera for receiving images for outputting to said interpreter.

42. A system according to claim 30 wherein infrared images are detected by said camera.

43. A system according to claim 30 wherein RADAR images are detected by said camera.

44. A system according to claim 30 wherein images through an opaque material are detected by said camera.

45. A monitoring system comprising:
a movably mounted camera adapted for receiving images of a space to be monitored by detecting an image through an opaque material;
an interpreter for receiving image data from the camera;
a reference memory for storing reference image data for plural images and a comparator adapted for comparing image data from the interpreter to image data for the plural images from the reference memory according to selected comparison criteria, wherein the interpreter and comparator cooperate to select recognizable portions of image data among unrecognized portions of image data in the space being monitored, the selected image portions being compared to the image data in the reference memory; and
an output interface for reporting results of the image data comparisons performed by the comparator.

46. A system according to claim 45 wherein the camera detects images using infrared light.

47. A system according to claim 45 wherein the camera detects images using a RADAR signal.

48. A system according to claim 45 wherein the camera detects thermal images.

49. A monitoring system comprising:
a first movably mounted camera adapted for receiving images of a space to be monitored;
a second camera adapted for receiving additional images of the space;
an interpreter for receiving image data from the first and second cameras, wherein said image data represents three dimensional images;
a reference memory for storing reference image data;
a comparator connected for comprising image data from the interpreter to image data from the reference memory according to selected comparison criteria, wherein the interpreter and comparator cooperate to select recognizable portions of image data among unrecognized portions of image data in the space being monitored, the selected image portions being compared to the image data in the reference memory; and
an output interface for reporting results of the image data comparisons performed by the compatator, wherein images that have changed in the space are detected and stored in a memory.

50. A monitoring system comprising:
a first movably mounted camera adapted for receiving images of a space to be monitored for monitoring certain characteristics of the space;
a second camera adapted for receiving additional images of the space for monitoring different characteristics of the space;
an interpreter for receving image data from the first and second cameras, wherein said image data represents three dimensional images;
a reference memory for storing reference image data;
a comparator connected for comparing image data from the interpreter to image data from the reference memory according to selected comparison criteria, wherein the interpreter and comparator cooperate to select recognizable portions of image data among unrecognized portions of image data in the space being monitored, the selected image portions being compared to the image data in the reference memory; and
an output interface for reporting results of the image data comparisons performed by the comparator.

51. A monitoring system comprising:
a movably mounted digital camera adapted for receiving images of a space to be monitored for directly outputting digital image data;
an interpreter for receiving said digital image data from the digital camera;
a reference memory for storing reference image data;
a comparator connected for comparing image data from the interpreter to image data from the reference memory according to selected comparison criteria, wherein the interpreter and comparator cooperate to select recognizable portions of image data among unrecognized portions of image data in the space being monitored, the selected image portions being compared to the image data in the reference memory; and
an output interface for reporting results of the image data comparisons performed by the comparator.

52. A monitoring system comprising:
a movably mounted digital camera adapted for receving images of a space to be monitored for directly outputting digital image data;
an interpreter for receiving said digital image data from the digital camera;
a reference memory for storing reference image data for plural images and a comparator adapted for comparing image data from the interpreter to image data for the plural images from the reference memory according to selected comparison criteria, wherein the interpreter and comparator cooperate to select recognizable portions of image data among unrecognized portions of image data in the space being monitored, the selected image portions being compared to the image data in the reference memory; and
an output interface for reporting results of the image data comparisons performed by the comparator.

\* \* \* \* \*

(12) EX PARTE REEXAMINATION CERTIFICATE (10193rd)

United States Patent
Adrain

(10) Number: US 5,831,669 C2
(45) Certificate Issued: Jun. 16, 2014

(54) FACILITY MONITORING SYSTEM WITH IMAGE MEMORY AND CORRELATION

(76) Inventor: John B. Adrain, Salt Lake City, UT (US)

Reexamination Request:
No. 90/012,882, May 30, 2013

Reexamination Certificate for:
Patent No.: 5,831,669
Issued: Nov. 3, 1998
Appl. No.: 08/677,100
Filed: Jul. 9, 1996

Reexamination Certificate C1 5,831,669 issued Aug. 21, 2012

Certificate of Correction issued Oct. 2, 2012

(51) Int. Cl.
*G06K 9/00* (2006.01)
*H04N 7/18* (2006.01)

(52) U.S. Cl.
USPC .................. 348/143; 348/159; 348/E7.086

(58) Field of Classification Search
None
See application file for complete search history.

(56) References Cited

To view the complete listing of prior art documents cited during the proceeding for Reexamination Control Number 90/012,882, please refer to the USPTO's public Patent Application Information Retrieval (PAIR) system under the Display References tab.

*Primary Examiner* — Salman Ahmed

(57) ABSTRACT

A video image of a space is monitored and compared to a reference image. Correlation of the images indicates presence of unwanted persons or objects or the occurrence of unwanted events. When programmed comparison criteria are met, an alarm is activated, the space is displayed on a monitor, and the image is stored in memory. Reference images are stored during dedicated or ongoing learn modes.

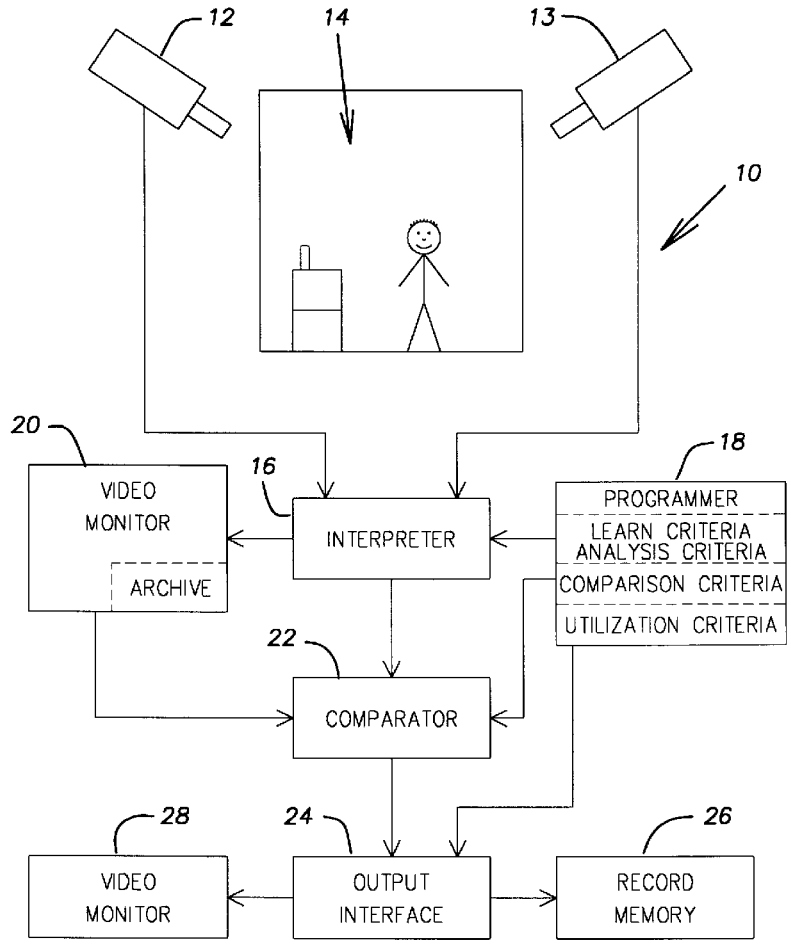

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 6 is confirmed.

Claims 1 and 11 were previously cancelled.

Claims 30-32, 35-39 and 41-42 are cancelled.

Claims 2-5, 7-10, 12-29, 33-34, 40 and 43-52 were not reexamined.

* * * * *